United States Patent Office 3,288,879
Patented Nov. 29, 1966

3,288,879
VULCANIZATION OF RUBBER WITH AN ORGANO-HYDROGEN POLYSILOXANE AND A CHLOROPLATINIC ACID COMPOUND
Moyer M. Safford, Schenectady, N.Y., assignor to General Electric Company, a corporation of New York
No Drawing. Filed July 23, 1963, Ser. No. 296,929
13 Claims. (Cl. 260—827)

This invention is concerned with the vulcanization of synthetic rubbers. More particularly the invention relates to a method of vulcanizing a synthetic rubber selected from the class consisting of (a) rubbery copolymers of a butadiene and acrylonitrile and (b) rubbery copolymers of a butadiene and styrene by the use of a minor weight proportion of a mixture of an organohydrogen polysiloxane and a chloroplatinic acid compound.

Rubbery copolymers of a butadiene and acrylonitrile are known in the art to be vulcanizable by sulfur, such copolymers being more particularly disclosed in U.S. Patent 1,973,000, issued September 11, 1934. Copolymers of a butadiene and styrene vulcanizable by sulfur are also known in the prior art as is more particularly described and shown in the book "Synthetic Rubber," edited by G. S. Whitby, C. C. Davis, and R. F. Dunbrook, published by John Wiley & Sons, Inc., New York, N.Y. (1954).

I have now discovered that the two above-described rubbery copolymers can be vulcanized with an entirely new class of vulcanizing agents whereby generally lower temperatures for vulcanization can be used than are normally required by the usual vulcanizing agents. More particularly, it was discovered that the above rubbery copolymers can be readily vulcanized by a mixture of an organohydrogen polysiloxane and a chloroplatinic acid compound employing the vulcanizing agents in a minor proportion of the total weight of the vulcanizing agent and the rubbery copolymer; preferably the mixture of vulcanizing agents comprises from about 2 to 20 percent, by weight, based on the weight of the rubbery copolymer undergoing vulcanization.

The butadiene used to make the copolymers with the styrene and the acrylonitrile has the general formula (I)
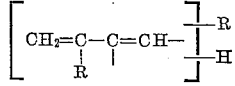

where R is a number selected from the class consisting of hydrogen and the methyl radical (e.g., butadiene-1,3,2-methyl pentadiene-1,3, etc.). The proportions of the olefin, specifically the acrylonitrile or styrene, with the butadiene, may be varied widely. Thus, the olefin may range, by weight, in amounts of from 10 to 90 percent and preferably from 15 to 60 percent of the total weight of the butadiene and the other copolymerizable ingredient, namely, the acrylonitrile or styrene.

In accordance with my invention, I incorporate in the particular synthetic rubbery polymer described above a minor proportion of a mixture of (a) an organopolysiloxane having the formula:

(II)
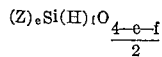

including organohydrogen polysiloxanes of the formula:

(III)         (ZHSiO)$_d$ etc., and (b) a chloroplatinic acid compound prepared by forming a reaction mixture of (A) chloroplatinic acid ($H_2PtCl_6$) with (B) at least 2 moles per gram atom of platinum of a member selected from the class consisting of alcohols having the formula R'OH, ethers having the formula R'OR', aldehydes having the formula R'CHO, and mixtures thereof and heating said reaction mixture at a temperature of from about 60 to 80° C. at a reduced pressure until the reaction product has a ratio of from about 2.0 to about 3.5 atoms of chlorine per atom of platinum, where R' is a member selected from the class consisting of alkyl radicals containing at least 4 carbon atoms, alkyl radicals substituted with an aromatic hydrocarbon radical, and alkyl radicals substituted with an OR" group, where R" is a member selected from the class consisting of monovalent hydrocarbon radicals free of aliphatic unsaturation and monovalent radicals free of aliphatic unsaturation and consisting of carbon, hydrogen and oxygen atoms, with each oxygen atom being attached to two other atoms, one of which is a carbon atom and the other of which is a member selected from the class consisting of a carbon atom and a hydrogen atom, Z is a member selected from the class consisting of monovalent hydrocarbon radicals, halogenated monovalent hydrocarbon radicals and cyanoalkyl radicals, $d$ is a whole number from 3 to 10, or more, $e$ has a value of from 0.5 to 2.49, inclusive, $f$ has a value of from 0.001 to 1.0, inclusive, and the sum of $e+f$ is equal to from 1.0 to 2.5, inclusive.

Among the radicals represented by Z can be mentioned, for example, alkyl radicals, e.g., methyl, ethyl, propyl, octyl, octadecyl, etc., radicals; cycloalkyl radicals such as, for example, cyclohexyl, cycloheptyl, etc., radicals; aryl radicals, e.g., phenyl, naphthyl, tolyl, xylyl, etc., radicals; aralkyl radicals, e.g., benzyl, phenyl ethyl, etc. radicals; cyanoalkyl radicals, e.g., beta-cyanoethyl, beta-cyanopropyl, gamma cyanopropyl, etc., radicals; and haloaryl and haloalkyl radicals, e.g., chloromethyl, chlorophenyl, dibromophenyl, etc., radicals. Preferably Z is the methyl radical or a mixture of methyl and phenyl radicals. In addition to the radicals mentioned above, the Z radical can also be an unsaturated aliphatic radical such as vinyl, allyl, cyclohexenyl, etc., radicals.

The chloroplatinic acid compound (hereinafter so designated) and methods for preparing such compositions are more particularly disclosed and claimed in copending application of Harry F. Lamoreaux, Serial No. 207,076, filed July 2, 1962, now U.S. Pat. 3,220,972, issued November 30, 1965, and assigned to the same assignee as the present invention. The precise chemical nature of the chloroplatinic acid compound is not known with certainty. However, it is known that such compounds are quite different from the chloroplatinic acid starting material. Whereas chloroplatinic acid contains six chlorine atoms per platinum atom, the catalyst from the present invention contains from 2.0 to 3.5 chlorine atoms per platinum atom. Chloroplatinic acid is soluble in water and polar organic materials, such as simple alcohols, and insoluble in conventional hydrocarbon solvents, such as benzene and toluene, while the chloroplatinic acid compound is insoluble in water but soluble in benzene or toluene.

One method for preparing the chloroplatinic acid compound and particularly the octoate derivative is as follows: 1 mole of chloroplatinic acid hexahydrate is mixed with seven moles of octyl alcohol until a solution is formed. The reaction mixture is then heated to a temperature of 70° C. and maintained at this temperature under a pressure of 25 millimeters. Hydrogen chloride and water which are formed during the reaction are immediately removed from the reaction mixture as formed. The reaction mixture is maintained under the pressure and temperature conditions recited for 40 hours. The course of the reaction is followed by withdrawing portions of the reaction mixture and examining the material withdrawn. During the course of the reaction, the chlorine-to-platinum ratio gradually falls from 6 atoms of chlorine per atom of platinum to 2 atoms of chlorine per atom of platinum. During this same period, infrared analysis indicates a reduction of the hydroxyl content of the reaction mixture. At the same time, an ether band and an aldehyde band are generated. At the end of 40 hours, infrared analysis indicates a constant level of hydroxyl groups, carbonyl groups and ether linkages. At the end of 40 hours, the reaction mixture is allowed to cool to room temperature at atmospheric pressure and the product is extracted with hexane, filtered, and hexane removed from the filtrate under vacuum. At this point, the chloroplatinic acid compound appears to be a complex of $PtCl_2$ and an ether and aldehyde derived from octyl alcohol. The complex can also involve some other residue of the octyl alcohol, or the octyl alcohol can still be present as a solvent. In order to examine the product further, a portion of the reaction mixture is heated at 70° C. at 2 millimeters and maintained under these conditions to remove excess alcohol until infrared analysis no longer indicates the presence of hydroxyl groups. This material is then dissolved in hexane and filtered and hydrogen is bubbled through the filtrate to form a precipitate. Examination of the liquid filtrate shows only a trace of platinum. By an infrared comparison analysis against pure octyl aldehyde and octyl ether, the liquid is shown to contain 47.1 percent octyl ether and 12.8 percent octyl aldehyde. The remainder is identified as a hydrocarbon resin. From these data, it appears that the initial complex contained 1 mole of octyl aldehyde to 2 moles of octyl ether and 1 mole of platinum to 2 moles of chlorine. This evidence also indicates that the octyl alcohol in the composition was present only as a solvent.

A further indication of the fact that the catalyst just described is a complex of $PtCl_2$ and an aldehyde and an ether is indicated by the fact that when a mixture of 1 mole of chloroplatinic acid hexahydrate and 1 mole of octyl aldehyde and 2 moles of octyl ether are heated at a temperature of 70° C. at a pressure of 20 millimeters for 25 hours, the product formed is indistinguishable from the product prepared by heating the chloroplatinic acid with octyl alcohol.

Among the alcohols of the formula R'OH which are used in the preparation of the chloroplatinic acid compound are those in which the hydroxyl group is attached to a hydrocarbon atom containing at least 4 carbon atoms, for instance, butanol, isobutanol, amyl alcohol, isoamyl alcohol, octyl alcohol, 2-ethylhexanol, tertiary butyl alcohol, undecanol, myricyl alcohol, etc. Another useful class of alcohols to make the chloroplatinic acid compound are the monoalkyl ethers of alkylene glycols and polyalkylene glycols, for instance, the monomethyl ether of ethylene glycol, the monobutyl ether of ethylene glycol, the monobutyl ether of diethylene glycol, and the monomethyl ethers of higher polyalkylene glycols, such as the monomethyl ethers of higher ethylene glycols and propylene glycols, etc. Included among the alcohols are the cyclic alcohols, such as cyclohexyl alcohol, etc. The preferred alcohol for use for the practice of the present invention is octyl alcohol.

Aldehydes of the formula R'CHO which can be employed are those where R' has the same meaning as given in connection with alkanols and include aldehydes in which the R' group contains from 5 to 15 carbon atoms, for instance, amyl aldehyde, octyl aldehyde, 2-ethylhexyl aldehyde, undecanal, myricyl aldehyde, etc.

Ethers which can be employed in making the chloroplatinic acid compound of the formula R'OR' include those in which both the organic groups attached to the ethereal oxygen atom contain at least 4 carbon atoms, for example, from 4 to 14 carbon atoms, for instance dibutyl ether, ditertiary butyl ether, diamyl ether, dioctyl ether, di-(2-ethylhexyl) ether, dimyricyl ether, etc.

The preferred aldehyde and the preferred ether for making the chloroplatinic acid compounds are octyl aldehyde and dioctyl ether.

Other methods for making these chloroplatinic acid compounds are described in the aforesaid Lamoreaux application which by reference is made part of the disclosures and teachings of the instant application.

It is apparent that some of the alcohols, aldehydes or ethers which are reacted with chloroplatinic acid to form the compound used in the practice of the present invention are solid materials which do not have melting points below the 60° C. to 80° C. temperature at which reaction is ordinarily effected. Where such a material is employed as a reactant, it is desirable to add an inert solvent to the reaction mixture to facilitate the reaction. Suitable solvents include the various hydrocarbon solvents such as benzene, toluene, xylene, mineral spirits, etc. In general, it is desirable to select a solvent which will evaporate from the reaction mixture under the reaction conditions.

Among the organohydrogen polysiloxanes operable as a portion of the vulcanization system of the present invention are polymers and copolymers containing up to 1 or more of the units having the formula:

$$Z_3SiO_{0.5}, Z_2SiO, ZSiO_{1.5}$$

or $$SiO_2$$

along with at least one hydrogen siloxane unit per molecule having the formula:

$$ZHSiO, Z_2HSiO_{0.5}, HSiO_{1.5}, H_2SiO$$

or $$ZH_2SiO_{0.5}$$

where Z is as previously defined.

Organopolysiloxanes within the scope of Formulae II and III are well known in the art and are prepared, for example, by the hydrolysis and condensation of various organochlorosilanes. Thus, where Z is methyl, cyclopolysiloxanes within the scope of Formula III can be prepared by hydrolyzing and condensing methyldichlorosilane. Products within the scope of Formula II can be prepared by cohydrolyzing and cocondensing a mixture of two or more chlorosilanes, at least one of which contains a silicon-bonded hydrogen atom. For example, compounds within the scope of Formula II can be prepared by the cohydrolysis and cocondensation of one or more members selected from the class consisting of trimethylchlorosilane, dimethyl dichlorosilane, methyltrichlorosilane or silicon tetrachloride with one or more members selected from the class consisting of methyldichlorosilane, dimethylchlorosilane, trichlorosilane, dichlorosilane, or methylchlorosilane. Thus, the hydrogen polysiloxanes can also be characterized as copolymers containing at least one unit per molecule having the formula:

(IV) $$(Z)_b(H)_cSiO_{\frac{4-b-c}{2}}$$

with the remaining siloxane units in the organopolysiloxane having the average formula:

(V) $$(Z)_nSiO_{\frac{4-n}{2}}$$

where Z is as previously defined, $b$ has a value of from 0 to 2, inclusive, $c$ has a value of from 1 to 2, inclusive, the sum of $b+c$ is equal to from 1.0 to 3.0, inclusive, and $n$ has a value of from 1.0 to 2.5, inclusive. Within the scope of Formula IV are hydrogen siloxane units mentioned previously, as well as methyl hydrogen siloxanes, e.g., methyl hydrogen siloxane units ($HSiCH_3O$) and dimethyl hydrogen siloxane units $[(CH_3)_2HSiO_{0.5}]$. The copolymers containing the siloxane units of Formula IV and the siloxane units of Formula V are present in proportions so as to form a hydrogen polysiloxane within the scope of Formula II. In general, the copolymers contain from 0.5 to 99.5 mole percent of the siloxane units of Formula IV with from 0.5 to 99.5 mole percent siloxane units of Formula V.

The hydrogen polysiloxanes are well known in the art and include such materials as 1,3-dimethyldisiloxane, 1,1,3-trimethyldisiloxane, 1,1,3,3-tetramethyldisiloxane as well as higher polymers containing up to 100,000 or more silicon atoms per molecule. Also included within the scope of Formula III are cyclic polymers of methyl hydrogen siloxane having the formula $$(CH_3SiHO)_d$$

where $d$ has the meaning above.

The proportions of the organohydrogen polysiloxane and the chloroplatinic acid compound can be varied widely, but generally comprise on a total weight basis of from 0.1 to 20 percent, by weight, based on the weight of the rubbery copolymer. As the concentration of the vulcanizing system increases, the rate of cure also increases. As far as the individual members of the vulcanizing system are concerned, on a weight basis, I can employ from 0.1 to 100 parts or more of the organohydrogen polysiloxane per part of the chloroplatinic acid compound.

The manner in which the invention may be practiced may be varied widely. The mixture of ingredients is preferably formed into a homogeneous moldable mass by the use of rubber milling rolls. Thereafter, the milled mass may be placed in a suitable mold and treated under pressures varying, for example, from 250 to 2000 p.s.i. for times ranging from about 10 to 90 minutes or more at temperatures ranging from about 100 to 150° C. These conditions, of course, may be varied or extended depending on the polymers used, the vulcanizing system, the proportion of ingredients including the vulcanizing catalyst, the application intended, etc.

In order that those skilled in the art may better understand how the present invention may be practiced, the following examples are given by way of illustration and not by way of limitation. All parts are by weight, including the values in the two tables, with the exception of the values for the physical properties and the sample numbers.

Example 1

A catalyst within the scope of the present invention was prepared by dissolving 1 part by weight of chloroplatinic acid hexahydrate in 10 parts of n-octyl alcohol and heating the solution at 70 to 75° C. at 25 millimeters for 16 hours during which time all water and hydrogen chloride were removed. The pressure was then reduced to 5 millimeters to remove all unreacted octyl alcohol. At the end of this time a product was obtained which was a dark, reddish-brown liquid soluble in alcohols, acetone, benzene, hexane, xylene, toluene and other common solvents. Chemical analysis of this mixture showed it to contain 3.5 atoms of chlorine per atom of platinum and 0.035 gram platinum per gram of the mixture. This octoate derivative of chloroplatinic acid will hereinafter be designated as "chloroplatinic acid octoate."

Example 2

Two methyl hydrogen polysiloxanes were prepared; one methylpolysiloxane (identified as "Polysiloxane I") was prepared by cohydrolyzing 37.5 mole percent methyldichlorosilane, and 62.5 mole percent dimethyldichlorosilane, and separating the cohydrolysis product which consisted of a methlypolysiloxane containing $(CH_3)_2SiO$ units and $CH_3SiHO$ units. Another methylpolysiloxane (identified as "Polysiloxane II") was prepared by hydrolyzing methyldichlorosilane and isolating a product which consisted of a mixture of cyclic polymers consisting of units of the formula $(CH_3SiHO)_d$ where $d$ has the meaning given above.

Example 3

A rubbery copolymer of butadiene-1,3 and acrylonitrile, in which the nitrile content was about 26 mole percent, was mixed on differential mill rolls with varying amounts of the octoate derivative of chloroplatinic acid described in Example 1 and the methylhydrogen polysiloxanes described in Example 2. As controls, the copolymer was also mixed with the chloroplatinic acid octoate alone and with the methylhydrogen polysiloxane alone. Each mixture of ingredients was molded for 30 minutes at 150° C. at a pressure of about 1000 p.s.i. and thereafter the tensile strength and percent elongation of each of the cured samples were determined at room temperature. The following Table 1 shows the ingredients used, the parts, by weight, of the ingredients together with the physical properties of the cured samples:

TABLE 1

| | Sample Number | | | | | | | |
|---|---|---|---|---|---|---|---|---|
| | 1 | 2 | 3 | 4 | 5 | 6 | 7 | 8 |
| Copolymer | 50 | 50 | 50 | 50 | 50 | 50 | 50 | 50 |
| Chloroplatinic acid octoate | 0.2 | 1.0 | ----- | 0.2 | 1.0 | 1.0 | 1.0 | ----- |
| Polysiloxane I | ----- | ----- | 2.5 | 2.5 | 10.0 | ----- | 10.0 | ----- |
| Polysiloxane II | ----- | ----- | ----- | ----- | ----- | 10.0 | ----- | ----- |
| Filler (carbon black—Micronex W-6) | ----- | ----- | ----- | ----- | ----- | ----- | 20.0 | ----- |
| Physical properties: | | | | | | | | |
| Tensile, p.s.i. | 59.1 | 55.3 | 53 | 91 | 529 | 338 | 1,340 | 68 |
| Percent elongation | 555 | 717 | 420 | 804 | 238 | 65 | 157 | 883 |

Example 4

In this example a rubbery copolymer prepared from about 72 parts butadiene-1,3 and 28 parts styrene was mixed with various amounts of methylhydrogen polysiloxanes and the octoate derivative of chloroplatinic acid in the same manner as described in Example 3 and thereafter pressed for 30 minutes at 150° C. at a pressure of about 1000 p.s.i. The following Table 2 shows the proportions, i.e., the parts by weight, and the types of ingredients, and the physical properties of the vulcanized samples:

TABLE 2

| | Sample Number | | | | | | | |
|---|---|---|---|---|---|---|---|---|
| | 1 | 2 | 3 | 4 | 5 | 6 | 7 | 8 |
| Copolymer | 50 | 50 | 50 | 50 | 50 | 50 | 50 | 50 |
| Chloroplatinic acid octotate | 0.2 | 1.0 | ----- | 0.2 | 1.0 | 1.0 | 1.0 | ----- |
| Polysiloxane I | ----- | ----- | 2.5 | 2.5 | 10.0 | ----- | ----- | ----- |
| Polysiloxane II | ----- | ----- | ----- | ----- | ----- | 10.0 | 10.0 | ----- |
| Filler (carbon black—Micronex W-6) | ----- | ----- | ----- | ----- | ----- | ----- | 10.0 | ----- |
| Physical Properties: | | | | | | | | |
| Tensile, p.s.i. | 35.1 | 77.1 | 36.6 | 302 | 328 | 342 | 743 | 66.2 |
| Percent elongation | 1,641 | 1,190 | (¹) | 635 | 149 | 53 | 233 | 944 |

¹ No break.

It will, of course, be apparent to those skilled in the art that various modifying agents, including various other fillers such as, for example, titanium dioxide, lithopone, various clays, iron oxide, etc., including plasticizers and other modifying resins and polymers, for instance, other rubbers and resins, both synthetic and natural resins, may be added within the scope of the invention.

In addition, it is intended that other types of rubbery polymers, many examples which have been given above, derived from a diene and either acrylonitrile or styrene, may be used without departing from the scope of the invention. The proportions of the diene and the olefinic monomer used to make the rubbery copolymer can be varied widely as has been pointed out previously. In addition, other chloroplatinic acid compounds derived from alcohols, aldehydes, or ethers with chloroplatinic acid may be employed as can other types of organohydrogen polysiloxanes, many examples of which have been described above and in the copending application of Harry F. Lamoreaux, Serial No. 207,076.

The proportions of the vulcanizing agent in the polymer and the proportions of the two members comprising the vulcanizing agent can be varied within wide limits, as previously pointed out. As the proportion of the vulcanizing agent mixture increases, the rate of vulcanization will also increase and vulcanization will be more rapid with increases in temperature. The presence of small amounts of the chloroplatinic acid compound is to be contrasted with much larger concentrations of vulcanizing agents used in the usual vulcanization of these rubbery copolymers. The presence of the organohydrogen polysiloxane is advantageous because it introduces into the vulcanized product organopolysiloxane constituents which add to the heat resistance and water repellency of the ultimately vulcanized product.

Finally, the various conditions disclosed in the foregoing examples, for example, times of heating and temperature, concentrations of ingredients, etc., may be varied at will depending upon the application involved and upon the properties desired in the final product. The exact procedure in preparing the claimed compositions of matter may, of course, be varied using procedures now well known in the rubber art. It is not believed necessary to give any more specific directions for such procedures since, as will be apparent, they will vary depending upon such factors as the application intended, properties desired in the final product, etc.

My invention is useful and has particular application in places where rubbery copolymers of the type described above are ordinarily used, as, for instance, in electrical insulation, clothing, protective purposes, etc. The physical properties of vulcanized products obtained in accordance with the practice of my invention compare favorably and in some instances are even better than the physical properties of vulcanized rubbery copolymers which have been cured in the usual fashion such as when using sulfur accelerators.

What I claim as new and desire to secure by Letters Patent of the United States is:

1. A vulcanizable composition of matter comprising (1) a synthetic rubber selected from the class consisting of copolymers of a butadiene and acrylonitrile, and copolymers of a butadiene and styrene and (2) a vulcanizing agent for (1) comprising a minor proportion sufficient to effect vulcanization of (1) of a mixture of ingredients composed of (a) an organohydrogen polysiloxane having the formula:

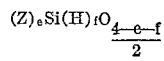

and (b) a chloroplatinic acid compound prepared by forming a reaction mixture of (A) chloroplatinic acid with (B) at least 2 moles per gram atom of platinum of a member selected from the class consisting of alcohols having the formula R'OH, ethers having the formula R'OR', aldehydes having the formula R'CHO, and mixtures thereof and heating said reaction mixture at a temperature of from about 60 to 80° C. at a reduced pressure until the reaction product has a ratio of from about 2.0 to about 3.5 atoms of chlorine per atom of platinum, where R' is a member selected from the class consisting of alkyl radicals containing at least 4 carbon atoms, alkyl radicals substituted with an aromatic hydrocarbon radical, and alkyl radicals substituted with an OR" group, where R" is a member selected from the class consisting of monovalent hydrocarbon radicals free of aliphatic unsaturation and monovalent radicals free of aliphatic unsaturation and consisting of carbon, hydrogen and oxygen atoms, with each oxygen atom being attached to two other atoms, one of which is a carbon atom and the other of which is a member selected from the class consisting of a carbon atom and a hydrogen atom, Z is a member selected from the class consisting of monovalent hydrocarbon radicals, halogenated monovalent hydrocarbon radicals and cyanoalkyl radicals, $e$ has a value of from 0.5 to 2.49, inclusive, $f$ has a value of from 0.001 to 1.0, inclusive, and the sum of $e+f$ is equal to from 1.0 to 2.5, inclusive.

2. The heat-treated product of claim 1.

3. A vulcanizable composition of matter comprising (1) a copolymer of a butadiene and acrylonitrile, and (2) a vulcanizing agent for (1) comprising a minor proportion sufficient to effect vulcanization of (1) of a mixture of ingredients comprising (a) an organohydrogenpolysiloxane having the formula:

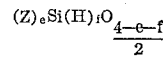

and (b) a chloroplatinic acid octoate, where Z is a member selected from the class consisting of monovalent hydrocarbon radicals, halogenated monovalent hydrocarbon radicals, and cyanoalkyl radicals, $e$ has a value of from 0.5 to 2.49, inclusive, $f$ has a value of from 0.001 to 1.0, inclusive, and the sum of $e+f$ is equal to from 1.0 to 2.5, inclusive.

4. A vulcanizable composition of matter comprising (1) a copolymer of a butadiene and styrene, and (2) a vulcanizing agent for (1) comprising a minor proportion sufficient to effect vulcanization of (1) of a mixture of ingredients comprising (a) an organohydrogenpolysiloxane having the formula:

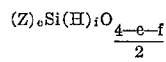

and (b) a chloroplatinic acid octoate, where Z is a member selected from the class consisting of monovalent hydrocarbon radicals, halogenated monovalent hydrocarbon radicals, and cyanoalkyl radicals, $e$ has a value of from 0.5 to 2.49, inclusive, $f$ has a value of from 0.001 to 1.0, inclusive, and the sum of $e+f$ is equal to from 1.0 to 2.5, inclusive.

5. A vulcanizable composition of matter comprising (1) a rubbery copolymer of butadiene-1,3 and acrylonitrile, and (2) a vulcanizing agent for (1) comprising a minor proportion sufficient to effect vulcanization of (1) of a mixture of ingredients composed of (a) a methyl hydrogen polysiloxane and (b) a chloroplatinic acid octoate.

6. A vulcanizable composition of matter comprising (1) a rubbery copolymer of butadiene-1,3 and styrene, and (2) a vulcanizing agent for (1) comprising a minor proportion sufficient to effect vulcanization of (1) of a mixture of ingredients composed of (a) a methyl hydrogen polysiloxane and (b) a chloroplatinic acid octoate.

7. The heat-treated product of claim 5.

8. The heat-treated product of claim 6.

9. A vulcanizable composition as in claim 5 in which there is present a filler.

10. A vulcanizable product as in claim 6 in which there is present a filler.

11. The process for vulcanizing a synthetic rubber selected from the class consisting of copolymers of a butadiene and acrylonitrile and copolymers of a butadiene and styrene, which process comprises incorporating in the aforesaid rubbery copolymer a vulcanizing agent comprising a minor proportion sufficient to effect vulcanization of the aforesaid class of polymers of a mixture of ingredients composed of (a) an organohydrogenpolysiloxane having the formula:

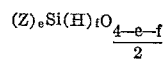

and (b) a chloroplatinic acid compound prepared by forming a reaction mixture of (A) chloroplatinic acid with (B) at least 2 moles per gram atom of platinum of a member selected from the class consisting of alcohols having the formula R'OH, ethers having the formula R'OR', aldehydes having the formula R'CHO, and mixtures thereof and heating said reaction mixture at a temperature of from about 60 to 80° C. at a reduced pressure until the reaction product has a ratio of from about 2.0 to about 3.5 atoms of chlorine per atom of platinum, where R' is a member selected from the class consisting of alkyl radicals containing at least 4 carbon atoms, alkyl radicals substituted with an aromatic hydrocarbon radical, and alkyl radicals substituted with an OR" group, where R" is a member selected from the class consisting of monovalent hydrocarbon radicals free of aliphatic unsaturation and monovalent radicals free of aliphatic unsaturation and consisting of carbon, hydrogen and oxygen atoms, with each oxygen atom being attached to two other atoms, one of which is a carbon atom and the other of which is a member selected from the class consisting of a carbon atom and a hydrogen atom, Z is a member selected from the class consisting of monovalent hydrocarbon radicals, halogenated monovalent hydrocarbon radicals and cyanoalkyl radicals, $e$ has a value of from 0.5 to 2.49, inclusive $f$ has a value of from 0.001 to 1.0, inclusive, and the sum of $e+f$ is equal to from 1.0 to 2.5, inclusive, and thereafter heating the mixture of ingredients at elevated temperatures to effect vulcanization of the synthetic rubber.

12. The process for effecting vulcanization of a copolymer of butadiene-1,3 and acrylonitrile, which process comprises incorporating in the aforesaid rubbery copolymer a minor proportion sufficient to effect vulcanization of the aforesaid copolymer of a mixture of ingredients comprising a methyl hydrogenpolysiloxane and a chloroplatinic acid octoate, and thereafter heating the mixture of ingredients at elevated temperatures to cause vulcanization of the rubbery copolymer.

13. The process of vulcanizing a synthetic rubber comprising a copolymer of butadiene-1,3 and styrene, which process comprises incorporating in the aforesaid copolymer a mixture of ingredients comprising a minor proportion sufficient to effect vulcanization of the aforesaid copolymer of a mixture of ingredients composed of a methyl hydrogenpolysiloxane and a chloroplatinic acid octoate, and thereafter heating the mixtures of ingredients at elevated temperatures to effect vulcanization of the rubber copolymer.

References Cited by the Examiner

UNITED STATES PATENTS

| | | | |
|---|---|---|---|
| 2,823,218 | 2/1958 | Speier et al. | 260—46.5 |
| 2,870,105 | 1/1959 | Ridway et al. | 260—46.5 |
| 2,970,150 | 1/1961 | Bailey | 260—827 |
| 3,129,204 | 4/1964 | Gilmont | 260—83.3 |
| 3,188,299 | 6/1965 | Chalk | 260—46.5 |

LEON J. BERCOVITZ, *Primary Examiner.*

R. A. WHITE, *Assistant Examiner.*